US008429706B2

(12) United States Patent
Henocq et al.

(10) Patent No.: US 8,429,706 B2
(45) Date of Patent: Apr. 23, 2013

(54) METHOD AND DEVICE FOR TRANSMITTING DATA

(75) Inventors: Xavier Henocq, Melesse (FR); Patrice Onno, Rennes (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 989 days.

(21) Appl. No.: 12/035,769

(22) Filed: Feb. 22, 2008

(65) Prior Publication Data

US 2009/0064254 A1 Mar. 5, 2009

(30) Foreign Application Priority Data

Feb. 27, 2007 (FR) ...................................... 07 53535

(51) Int. Cl.
*H04N 7/173* (2011.01)
(52) U.S. Cl.
USPC .................. 725/116; 725/93; 725/94; 725/95; 725/96
(58) Field of Classification Search .......................... None
See application file for complete search history.

(56) References Cited

U.S. PATENT DOCUMENTS

| 6,292,512 | B1 * | 9/2001 | Radha et al. ................ 375/240.1 |
| 6,996,173 | B2 | 2/2006 | Wu et al. | |
| 2003/0135863 | A1 * | 7/2003 | Van Der Schaar .............. 725/95 |
| 2003/0151753 | A1 * | 8/2003 | Li et al. ............................ 358/1.9 |
| 2004/0039810 | A1 | 2/2004 | Donescu et al. ............... 709/223 |
| 2005/0246751 | A1 * | 11/2005 | Boyce et al. .................... 725/101 |
| 2006/0184607 | A1 | 8/2006 | Le Leannec et al. ......... 709/203 |
| 2006/0262345 | A1 | 11/2006 | Le Leannec et al. ........ 358/1.15 |
| 2009/0300205 | A1 * | 12/2009 | Jabri ............................. 709/231 |

OTHER PUBLICATIONS

French Preliminary Search Report mailed Dec. 4, 2007 for French Patent Application No. 0753535.
Nilsson et al., "Adaptive Multimedia Streaming Over IP" International Conference on Visual Information Engineering, Jul. 7, 2003, pp. 214-217, XP008023217.
McCanne et al., "Receiver-Driven Layered Multicast" Computer Communication Review, ACM, New York, NY, No. 4, Oct. 1996, pp. 117-130, XP002452811.
Qiang et al., "SARLM: Sender-Adaptive & Receiver-Driven Layered Multicasting for Scalable Video" Multimedia and Expo, 2001. ICME 2001. IEEE International Conference on Aug. 22-25, 2001, Piscataway, NJ, USA, IEEE, Aug. 22, 2001, pp. 757-760, XP010661949.
French Patent Application No. 0650974.

* cited by examiner

*Primary Examiner* — Nasser Goodarzi
*Assistant Examiner* — Fred Peng
(74) *Attorney, Agent, or Firm* — Fitzpatrick, Cella, Harper & Scinto

(57) ABSTRACT

This method of transmitting coded data, representing a digital video, from a server to a plurality of clients, at least one subset of the clients using congestion control algorithms, uses a plurality of signals for passing from a coded representation of the video at a given quality level to a coded representation at least one quality level different from the given level. The sending (E618) of at least one of the passage signals at least to the subset of clients depends on information representing the behavior of the congestion control algorithms used by the subset of clients.

20 Claims, 12 Drawing Sheets

METHOD AND DEVICE FOR TRANSMITTING DATA

The present invention relates to a method and device for transmitting coded data representing a digital video, in a telecommunication network.

The invention belongs to the field of video transmission. It is particularly advantageous when the application consists of transmitting a video from a server to several clients having different capacities and varying over time.

The invention applies in particular to hierarchical or "scalable" video compression, in the SNR (Signal to Noise Ratio) dimension and offering the functionality of progressive coding of the texture information. The present invention therefore applies in particular to the case of the SVC system (Scalable Video Coding), for which a standard is currently being produced. It also applies to hierarchical video coding comprising the possibility of coding samples representing texture in a progressive and embedded fashion, using technologies of embedded quantization and coding by bit planes, for example.

This application of the invention is nevertheless not limiting. This is because the invention can also be implemented using a non scalable coding, of the H.264 type.

The future video compression standard known as "SVC" makes provision for providing a hierarchical, or "scalable", video representation, that is to say at different levels evaluated according to three criteria or dimensions: the signal-noise ratio, known by the term SNR, which defines the quality of the coding pixel by pixel, temporal resolution, that is to say the number of images per second represented by the coded data, and spatial resolution, that is to say the number of pixels represented by the coded data.

The SVC standard is being developed by the JVT (Joint Video Team) group, which brings together experts in video compression from the MPEG group of the ISO/IEC and video experts from the ITU. This new standard repeats as its basis the compression techniques from the MPEG-4-AVC standard, also referred to as H.264. The technological advances of SVC concern principally the scalability of the video format. This is because this new video format can be decoded differently according to the possibilities of the decoder and the characteristics of the network. For example, using a high-resolution video (type SD, 704×576, 60 Hz), it will be possible to code in a single bitstream, using two "layers", the compressed data of the SD sequence and those of a sequence to the CIF format (352×288, 60 Hz). In order to decode the CIF resolution, the decoder will decode only part of the information coded in the bitstream. Conversely, it will have to decode all the bitstream in order to restore the SD version.

This example illustrates the functionality of spatial scalability, that is to say the possibility, from a single stream, of extracting videos where the image size is different.

The SVC video compression system provides scalabilities in the temporal, spatial and SNR (in terms of quality) dimensions. Temporal scalability is obtained by means of the B images.

SNR scalability exists in two forms: fine SNR scalability, denoted FGS, is obtained by progressive quantization of the images. Coarse SNR scalability or CGS is supplied by the coding of a layer in which a temporal decomposition is performed independently of the lower layer, and which is predicted from the directly lower layer.

Finally, spatial scalability is obtained by predictive coding of a layer in which a temporal decomposition is performed independently of the lower layer. The coding of a spatial refinement layer is similar to that of a CGS layer, except that it serves to compress the video sequence at a higher resolution level compared with the lower level. It includes in particular a step of spatial supersampling in the two spatial dimensions (width and height) in the inter-layer prediction process.

FIG. 1 illustrates an example of multilayer organization possible with the SVC standard. The base layer 200 represents the sequence of images at its lowest spatial resolution level, compressed in a fashion compatible with the H264/AVC standard. As illustrated in FIG. 1, the base layer is composed of type I, P and B hierarchical images, their enhanced versions being denoted respectively EI, EP and EB.

The B hierarchical images constitute a means of generating a base layer scalable in the temporal dimension. They are denoted $B_i$, $i \geq 1$, and comply with the following rule: an image of the $B_i$ type can be predicted temporally from anchoring images, reference images of type I or P that appear at the boundaries of the Group Of Pictures processed, surrounding it, as well as $B_j$ images, $j<i$, located in the same range of I or P anchoring images. It will be observed that, between the anchoring images, there are type B images. It will also be observed that a $B_1$ image, that is to say the first image in a sequence, can be predicted only from anchoring images surrounding it since there is no $B_j$ image with $j<1$.

In FIG. 1, two spatial refinement layers 205 and 210 are illustrated. The first spatial refinement layer 205 is coded predictively with respect to the base layer 200 and the second spatial refinement layer 210 is predicted from the first spatial refinement layer 205. A spatial supersampling step consisting of supersampling with a coefficient 2 occurs during these inter-layer predictions, so that a higher layer contains images whose definitions are, in each dimension, twice those of the immediately lower layer.

FIG. 2 illustrates the hierarchical representation of FIG. 1, in which refinement layers 300 and 305 of the FGS type have been added.

Concerning SNR scalability, a refinement, or enhancement, layer of the SNR type contains data useful for decompressing a video sequence at a quality level higher than that of the lower layer in the video representation hierarchy.

An SNR refinement layer can take two forms:
  a refinement layer of the CGS type (Coarse Grain Scalability) contains both refinement data for the motion data and refinement data for the texture data. A CGS quality layer combines on the one hand motion-compensated temporal prediction within this layer and on the other hand predictive coding for the motion and texture data from its base layer; and
  a refinement layer of the FGS type (Fine Grain Scalability) contains solely data for the progressive refinement of the texture information. One or more successive FGS quality layers can be coded on top of the base layer, a spatial scalability layer or a CGS layer. Typically, embedded quantization means and means for the progressive coding of the DCT coefficients (Discrete Cosine Transform) make it possible to supply an embedded FGS bitstream, able to be truncated at any position and progressively increasing the quality of all the image in question. This is because the quantization step that was allocated to the texture data of the previous quality layer is divided by two and the associated data are requantized with the new quantization step of the current FGS layer.

In addition, the FGS coding produces portions of compressed bitstream able to be truncated at any point. The segment of bitstream thus truncated is still decodable and its decoding restores a refinement of the quality of all the images in question. This property results from the cyclic coding of the DCT coefficients of the various macroblocks used in FGS technology.

FGS technology supplies a practical and effective means for achieving rate control in a SVC transmission system: when the bandwidth available between a coder and a decoder so permits, the coder can send the data of a supplementary quality level. Conversely, when it is wished to reduce the bandwidth consumed, the coder no longer sends the data representing the highest quality level.

Temporal prediction involves two steps: motion estimation and motion compensation, known to persons skilled in the art. Recent studies show that the best compression performance is obtained when the temporal prediction loop functions in the mode known as "closed loop".

Concerning motion estimation, the so-called "closed loop" approach consists of estimating the motion vectors between an original image to be compressed and the reconstructed version (coded and then decoded) of a reference image.

With regard to motion compensation, the closed loop approach consists of calculating the prediction error between an original block and a reconstructed version of its reference block compensated for motion. In addition, when several quality layers of the FGS type are generated in the SVC bitstream, according to these studies the best compression performance is obtained when a motion compensation is used in the coding of each FGS quality level. This is because closed loop coding has the property of compensating for the quantization distortion that was introduced into the reference images. It also provides synchronization between the coder and decoder when the video is decoded at a constant quality level, this term synchronization meaning that the coder and decoder use identical reference images in the temporal prediction process.

When FGS technology is used for rate control purposes in order to transmit a precoded SVC stream, the compressed video stream server may need to modify its transmission rate according to a variable bandwidth. Unfortunately, changing from one quality layer to another stops the synchronization between the coder and decoder. This is because, during the transmission rate modification phase, the decoder reconstructs reference images different from those that have been decoded by the coder during the coding preceding the transmission phase. A defect, referred to as "drift", is introduced, which means that images reconstructed by the decoder are different from those reconstructed by the coder. The result is a reduction in the visual quality displayed compared with what should be displayed by the decoder. In addition, this drift is propagated on several images, because of the temporal prediction loop.

The document U.S. Pat. No. 6,996,173 describes a method of video transmission from a server to a client over an unreliable network, based on images similar to the SP images defined in the MPEG-4 standard part 10, AVC/H.264. In this approach, several scalable video streams with different rates representing the same video sequence are generated by a server. According to the variations in the transmission rate available on the network, a client can pass from one stream to another. However, this document does not mention the possibility of using several types of passage signals, nor how to choose the frequency for sending the passage signals.

A similar application is proposed in an article by M. E. NILSSON et al. entitled *"Adaptive multimedia streaming over IP"*, BTexact Technologies. Several streams representing an identical video but at different transmission rates are transmitted over a network. A passage data stream allowing passage from one video stream to another is generated by the server when the latter considers that a client must connect to another video stream. Apart from the fact that this application is not very scalable since the sending of the passage data to a client is decided on by the server, this application uses only one type of passage signal.

The French patent application with the filing number 06 50974 proposes a solution for resolving the problem of drift mentioned above, by reducing the synchronization loss that may result from an increase or reduction in FGS quality level. It proposes to code and insert a differential texture signal making it possible to jump from one FGS quality level to another, whilst keeping the decoder synchronized with the coder.

In addition, the residual signal introduced is compatible with the FGS coding process and therefore requires no modification to the decoding process. It is transmitted only when the number of FGS quality levels transmitted is modified. This solution is typically applied to images of the P type in the SVC compression system. It can also be used for the purpose of resisting transmission errors that may for example occur on a transmission network with packet loss, such as the Internet.

Hereinafter, this differential texture signal is referred to equally well as "FGS switch" or "passage signal".

None of the solutions of the prior art mentioned above make it possible to regulate the sending of passage signals according to the variable capacities of the clients.

The aim of the present invention is to remedy this drawback.

For this purpose, the present invention proposes a method of transmitting coded data, representing a digital video, from a server to a plurality of clients, at least one subset of the clients using congestion control algorithms, this method being remarkable in that it uses a plurality of signals for passing from a coded representation of the video at a given quality level to a coded representation at least one quality level different from the given level, the sending of at least one of the passage signals at least to the subset of clients being a function of information representing the behavior of the congestion control algorithms used by the subset of clients.

Thus, the invention enables the server to fix firstly the sending frequency and secondly the type of passage signals sent, according to the capacities of the clients and the state of loading of the network. In this way the quantity of information transmitted relating to the changes in quality level are adapted according to the requirements of the clients. Thus the share of bandwidth granted to the video data compared with the data for passing between quality levels is optimized.

According to a particular characteristic, the method comprises a step consisting of calculating statistics concerning transitions between quality levels from information representing the behavior of the congestion control algorithms.

These statistics enable the server to have a summary overview of the behavior of the congestion control algorithms of all the clients that use them.

According to a particular characteristic, the method also comprises a step consisting of determining the type and frequency of change in quality level according to the statistics.

This frequency and type information will enable the server to best adjust the type of passage signals to be sent as well as the frequency of sending of these signals.

According to a particular characteristic, the method comprises steps according to which:
there are created, in a network containing the server and the plurality of clients, a predetermined number of multicast groups to which the clients are able to subscribe, according to the number of quality levels existing in said video;

passage data is initialized by attributing a default value to a quality level change frequency and choosing a default type of passage signal to be transmitted;

the video data is transmitted over its respective multicast group and the passage data is transmitted over the multicast group transporting the video data corresponding to the lowest quality level as from which the passage signal contained in the passage data allows transition between levels;

it is checked whether one or more clients have transmitted to the server reports containing information representing the behavior of the congestion control algorithm used by these clients;

if at least one report has been transmitted, statistics concerning the transitions between levels are calculated, from information contained in the reports;

a new value is attributed to the quality level change frequency for each possible transition, according to the statistics obtained previously;

one or more types of passage signals to be transmitted are determined, according to information contained in the reports; and the passage signals determined previously with the frequencies and types determined previously are transmitted from the server to the clients.

The reception conditions on the network being variable, the algorithm proposed adapts constantly to their changes.

The diversity of these passage signals makes it possible to find the best compromise between functionality of passage and transmission rate allocated to these signals according to the statistics.

According to a particular characteristic, the step of creating multicast groups consists of creating one multicast group per quality level.

Transmitting the quality levels over multicast groups makes it possible on the one hand to transfer the rate regulation to the client side and on the other hand to have good granularity of adaptation of the rate.

According to a particular characteristic, the statistics calculation step consists of calculating the number of passages from one quality level to another for each possible transition.

According to a particular characteristic, the statistics calculation step consists of calculating, for each possible transition, the minimum value, the maximum value, the mean value and the median value of the interval of time between the last two attempts at subscription of a client to a multicast group.

According to a particular characteristic, during the step of allocating the change in level frequency value, the mean value of this frequency is attributed to the frequency of change in quality level for each possible transition.

In this way all the most representative clients are satisfied.

According to a particular characteristic, during the step of determining passage signals to be transmitted, it is decided to transmit a passage signal for each transition on which the reports contain information.

In this way the probability that a client has available a passage signal when he needs it is increased.

In a particular embodiment, in which the quality levels are scalability levels, the plurality of types of passage signal comprise:

a first type of passage signal for passing from one quality level to the immediately higher quality level, a second type of passage signal for passing from one quality level to any single higher quality level, and a third type of passage signal for passing from one quality level to more than one higher quality level.

In a particular embodiment, the video is coded according to the SVC (Scalable Video Coding) standard.

In another particular embodiment, the video is coded according to the H.264 standard.

For the same purpose as that indicated above, the present invention also proposes a device for transmitting coded data, representing a digital video, from a server to a plurality of clients, at least one subset of the clients using congestion control algorithms, this device being remarkable in that it uses a plurality of signals for passing from a coded representation of the video at a given quality level to a coded representation at least one quality level different from the given level, and in that it comprises a module for sending at least one of the passage signals at least to the subset of clients as a function of information representing the behavior of the congestion control algorithms used by the subset of clients.

Still for the same purpose, the present invention also proposes a telecommunications system comprising a plurality of terminal devices connected through a telecommunications network, comprising at least one terminal device equipped with a data transmission device as succinctly described above.

Still for the same purpose, the present invention also relates to an information storage means that can be read by a computer or a microprocessor storing instructions of a computer program, remarkable in that it allows the implementation of a data transmission method as succinctly described above.

In a particular embodiment, this storage means is partially or totally removable.

Still for the same purpose, the present invention also relates to a computer program product able to be loaded into a programmable apparatus, containing sequences of instructions for implementing a data transmission method as succinctly described above, when this program is loaded into and executed by the programmable apparatus.

The particular characteristics and the advantages of the data transmission device, of the telecommunication system, of the information storage means and of the computer program product being similar to those of the data transmission method, they are not repeated here.

Other aspects and advantages of the invention will emerge from a reading of the following detailed description of a particular embodiment, given by way of non-limiting example. The description refers to the drawings that accompany it, in which:

FIG. 1, already described, depicts schematically an example of possible multilayer organization of a video sequence according to the SVC standard;

FIG. 2, already described, depicts schematically the insertion of FGS refinement layers in a multilayer representation of the type in FIG. 1;

In the context of the present invention, the telecommunication network in question is of the multicast type. A server transmits a video sequence to several clients having different capacities and varying over time. Each scalability level generated by the server is transmitted over a multicast group. Each client decides to subscribe to a set of multicast groups according to his capacities. He can modify his subscription according to variations in the state of the network and can thus increase the number of FGS quality levels received.

Figure 1:
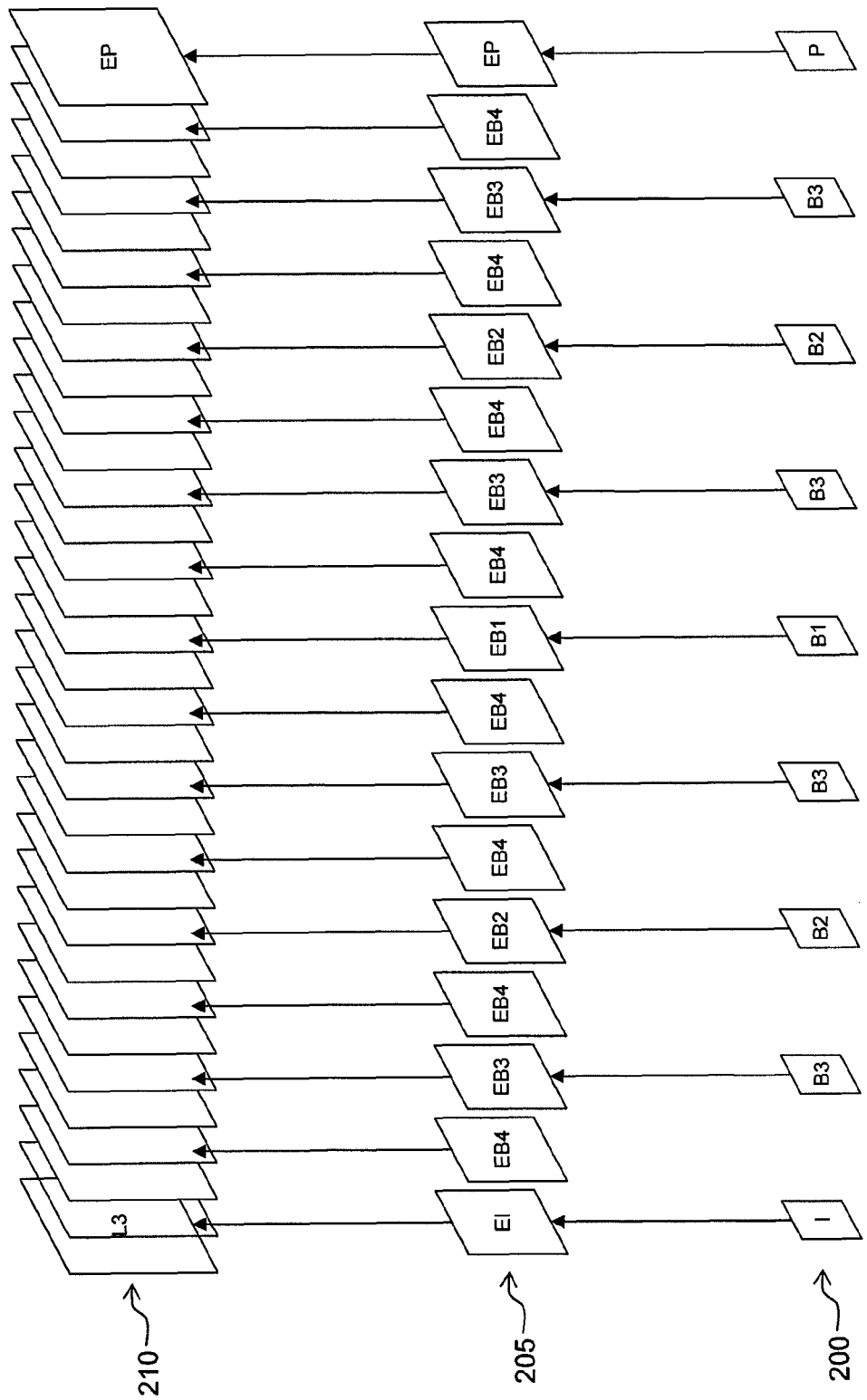
Figure 2:
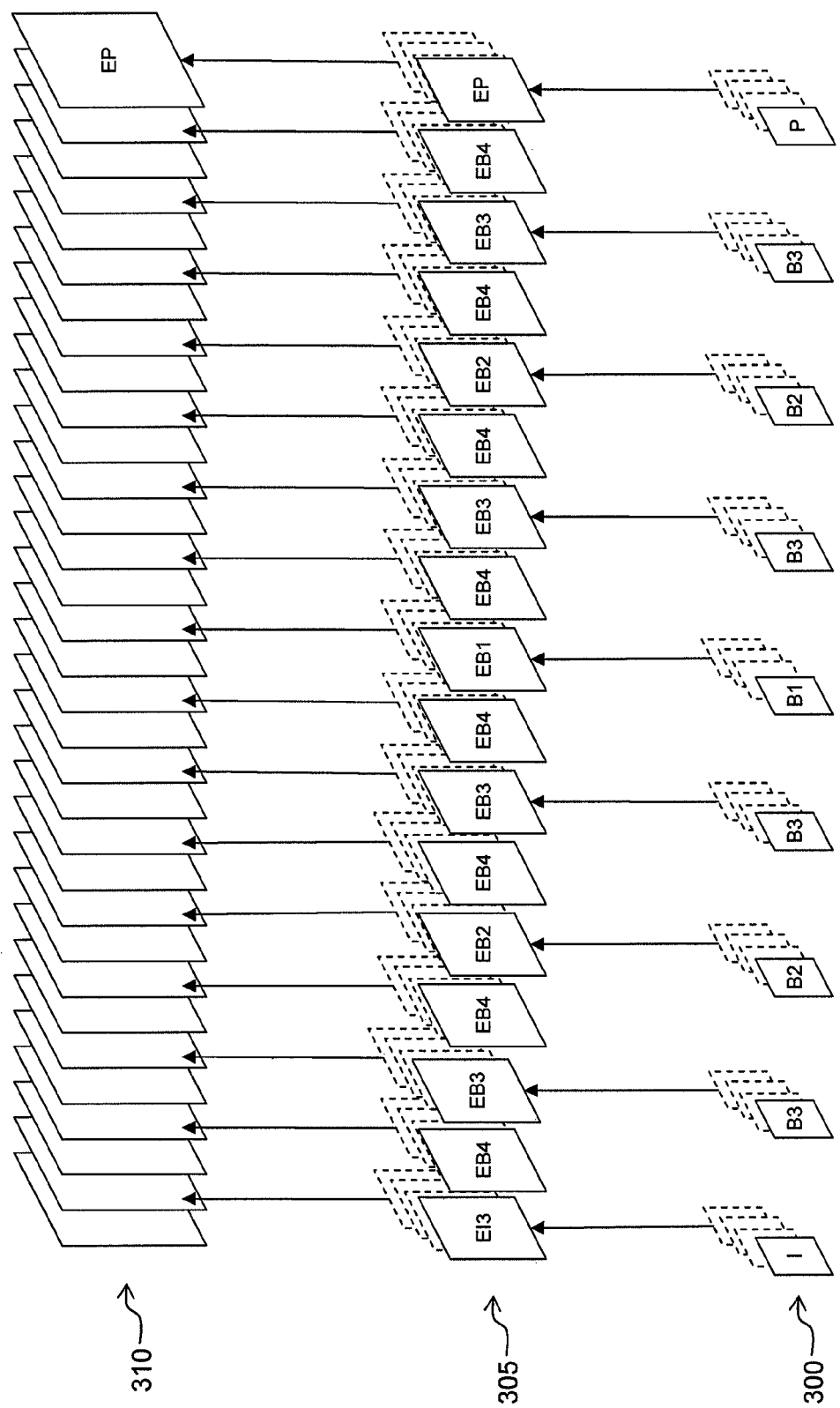
Figure 3:
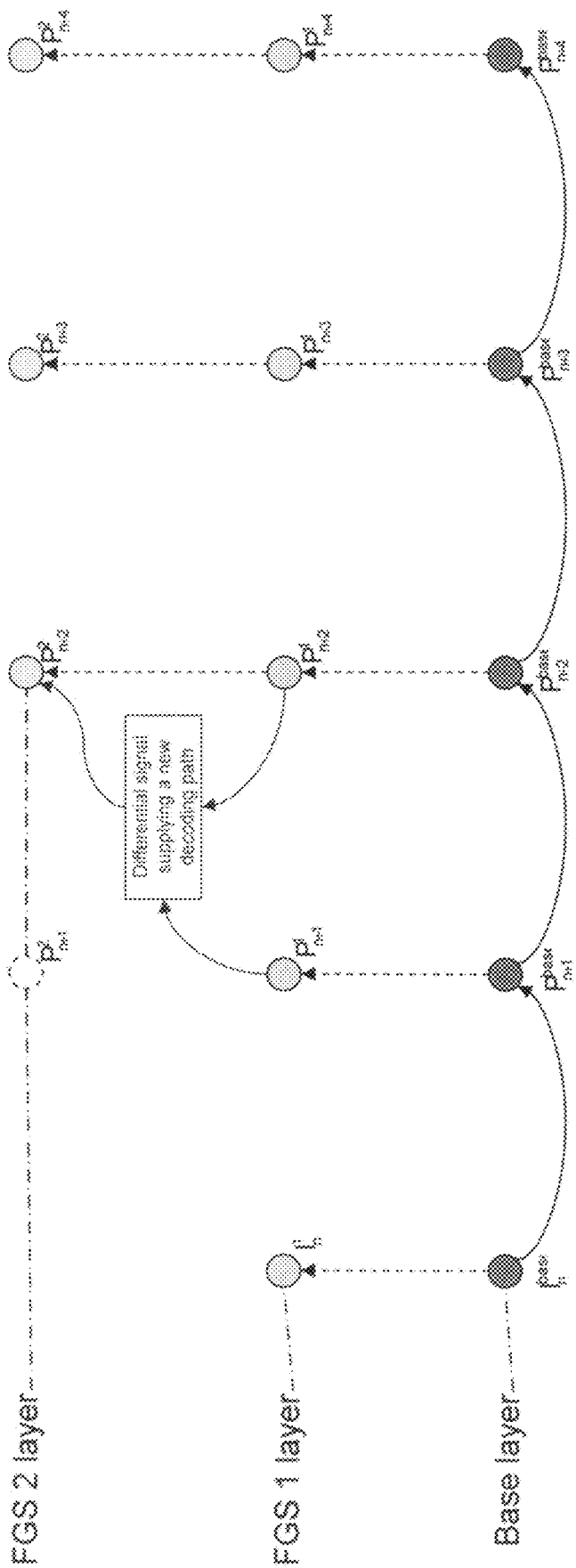
FIG. 3 illustrates the principle of a passage signal of the "FGS switch" type.

FIG. 3 illustrates the principle of a passage signal of the "FGS switch" type described in the French patent application with the filing number 06 50974.

The processing operations relating to the passage signals are executed solely by the coder, whilst the associated video decoding algorithm remains unchanged. They consist of generating a texture refinement signal in accordance with the FGS technology specification in the SVC standard, but making it possible to reconstruct a P image at a given FGS quality level (the image $P_{n+2}^2$ in FIG. 3) from a reference image reconstructed at a lower quality level.

To do this, the texture refinement signal is calculated by the coder so as to make it possible to reconstruct a temporal prediction error image which, once added to the reference image reconstructed at the lower level, restores a reconstructed image ($P_{n+2}^2$) as close as possible to that which would be reconstructed if the temporal prediction were made with the reference image ($P_{n+2}^2$) reconstructed at the current FGS level.

Consequently, the coder must first of all code and then decode the current image ($P_{n+2}^2$ in FIG. 3) at the current quality level, using the reference image normally intended for this purpose, denoted $P_{n+1}^2$, which appears in FIG. 3 but is assumed to be not available on the decoder side. Next, the coder reconstructs the temporal prediction residue by decoding the texture data of the image of temporal index n+2 as far as the FGS quality level of index 1. The prediction error signal issuing from this last decoding is denoted $E_{n+2}^1$. In addition, the coder reconstructs the reference image $P_{n+1}$ as far as the FGS quality level of index 1. It then remains for the coder to calculate the difference between the reconstructed image $P_{n+2}^2$ and the sum of the reconstructed reference image $P_{n+1}^1$, and the prediction error signal $E_{n+2}^1$, in order to know the texture refinement that must be coded in the refinement signal FGS $P_{n+2}^2$.

Thus the differential signal corresponding to the difference calculated above enables the decoder to reconstruct a temporal prediction error signal which, added to the reconstructed reference image $P_{n+1}^1$ makes it possible to reconstruct the image $P_{n+2}^2$ close to its reconstructed version on the coder side. Thus the synchronization between the decoder and the coder is maintained despite the increase in the number of FGS refinement layers decoded during the sequence. The differential signal thus coded, or "FGS switch", is denoted $S_{(n+1,1) \to (n+2,2)}$, illustrating that it makes it possible to pass from the reconstructed reference image $P_{n+1}^1$ to the reconstructed current image $P_{n+2}^2$.

Figure 4:
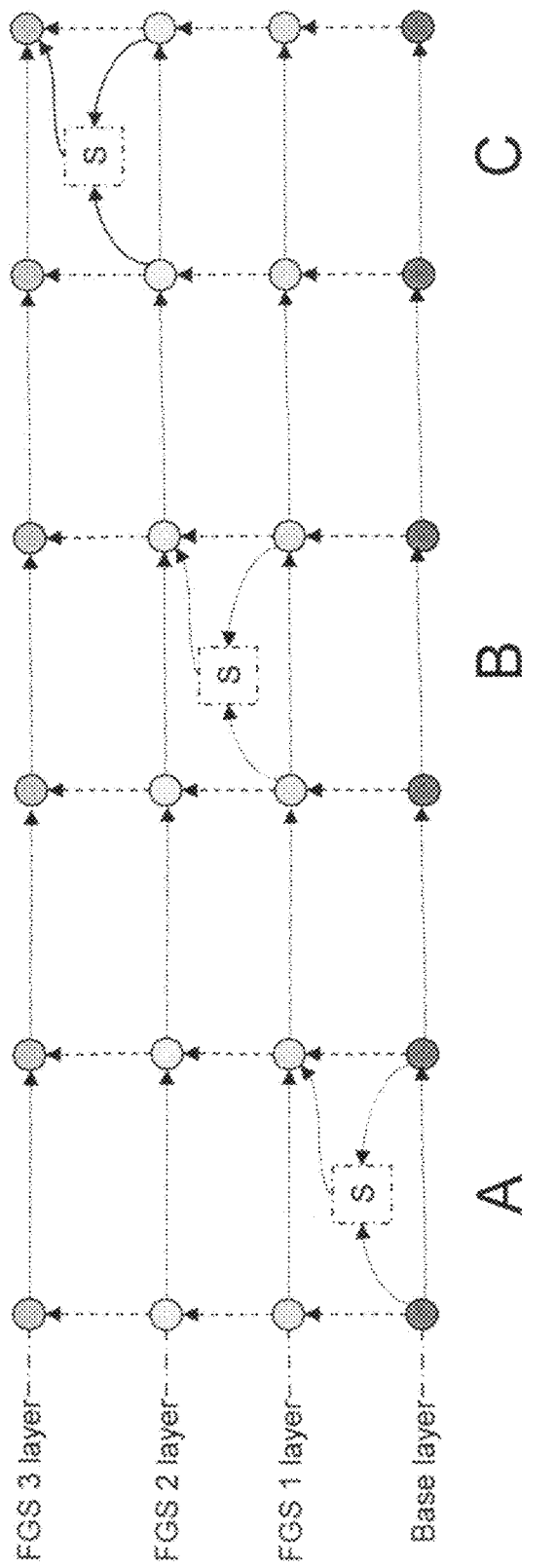
FIGS. 4 to 6 illustrate various types of FGS switch.

The type-1 switch depicted in FIG. 4 makes it possible to pass from a spatial scalability level CGS or FGS to the immediately higher FGS level. The type-2 switch depicted in FIG. 5 makes it possible to pass directly from a spatial scalability level CGS or FGS to any one and only one higher FGS level.

Figure 6:
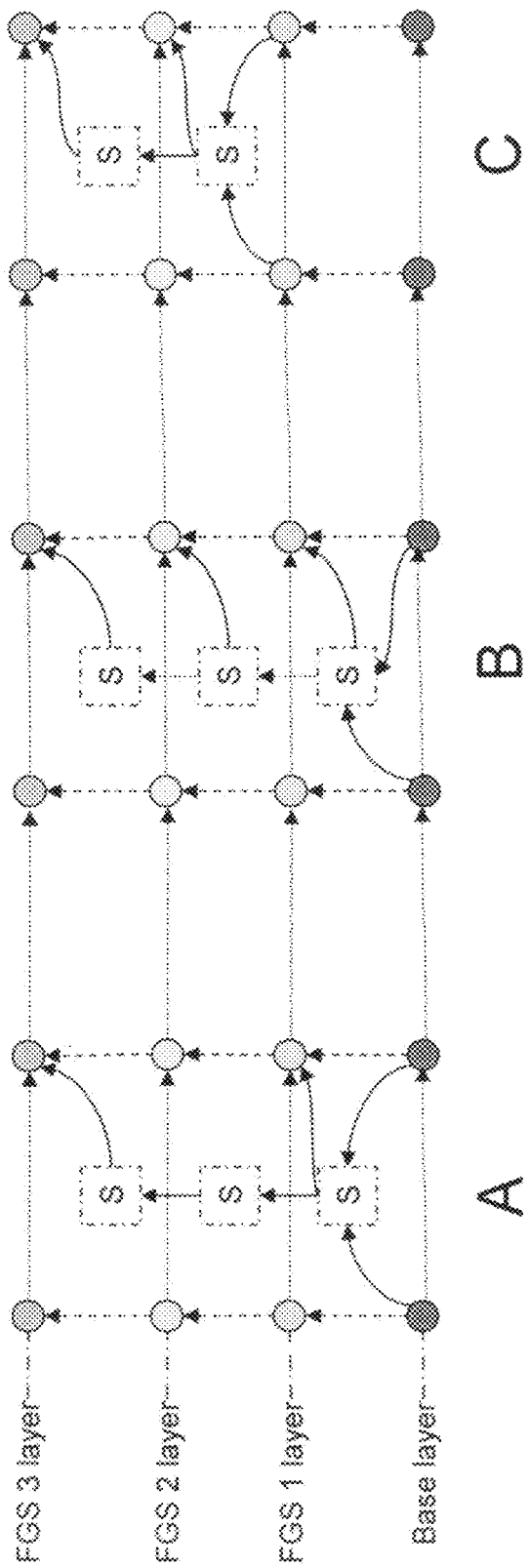

The type-3 switch depicted in FIG. 6 makes it possible to pass from a spatial scalability level CGS or FGS to more than one higher FGS level.

Figure 12:
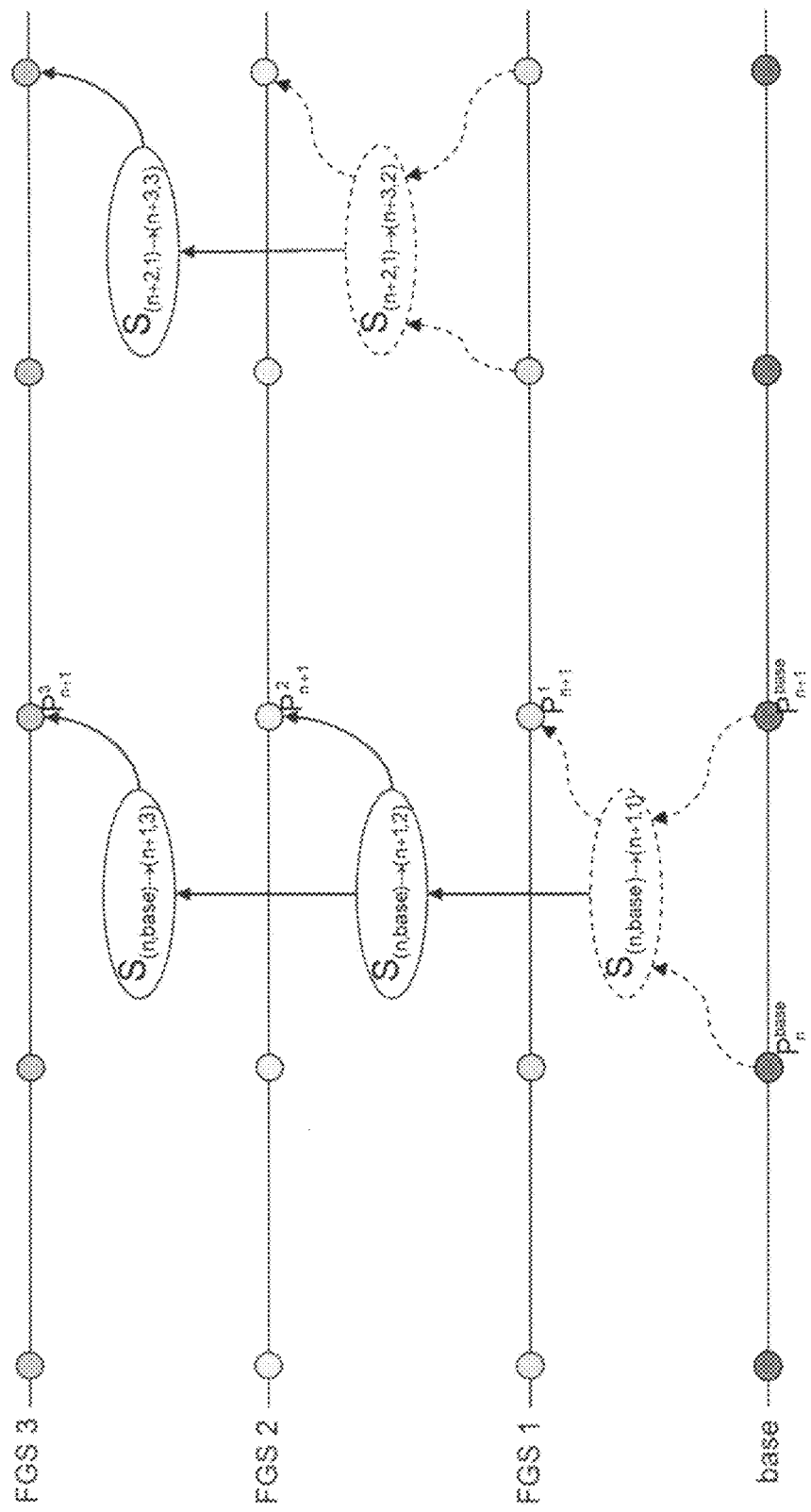
FIG. 12 illustrates the various passage functionalities offered simultaneously by type 3 passage signals illustrated in FIG. 6.

In order to create type-3 switches, first of all a first signal of the FGS switch type is coded, to allow passage from the base layer to the first FGS refinement layer on top of the base layer. This first stage of the FGS switch hierarchy is illustrated in dotted lines in FIG. 12 and is denoted $S_{(n,base) \to (n+1,1)}$.

Next, the higher FGS switches in the hierarchy, illustrated in solid lines, are coded as follows. To code the first FGS switch illustrated in solid lines, the image targeted by the previously coded FGS switch is reconstructed by decoding the latter. The reconstructed image is therefore an approximation of the following image $P_{n+1}^1$, that would be reconstructed by decoding the regular FGS layer denoted FGS 1 in FIG. 12.

The coding of the next signal of the FGS switch type consists of henceforth taking as the target image the reconstructed image $P_{n+1}^2$, that is to say the following image reconstructed at the next FGS quality level. The difference between this new target image and the image reconstructed by the decoding of the last coded FGS switch $S_{(n,base) \to (n+1,1)}$ is therefore formed. This difference then constitutes the new residual signal to be compressed. Its compression is carried out by implementing a coding according to the FGS syntax. The signal thus coded, denoted $S_{(n,base) \to (n+1,2)}$, is inserted in the SVC bitstream as a refinement of the texture signal coded in the previous FGS switch $S_{(n,base) \to (n+1,1)}$. It is therefore coded with a quantization step divided by two compared with the quantization step used in the switch signal $S_{(n,base) \to (n+1,1)}$.

The above coding operation, providing the signal for passage between FGS layers $S_{(n,base) \to (n+1,2)}$, is then reiterated in a similar fashion in order to code the third passage signal $S_{(n,base) \to (n+1,3)}$ in the series of FGS switches in the course of construction.

Figure 5:
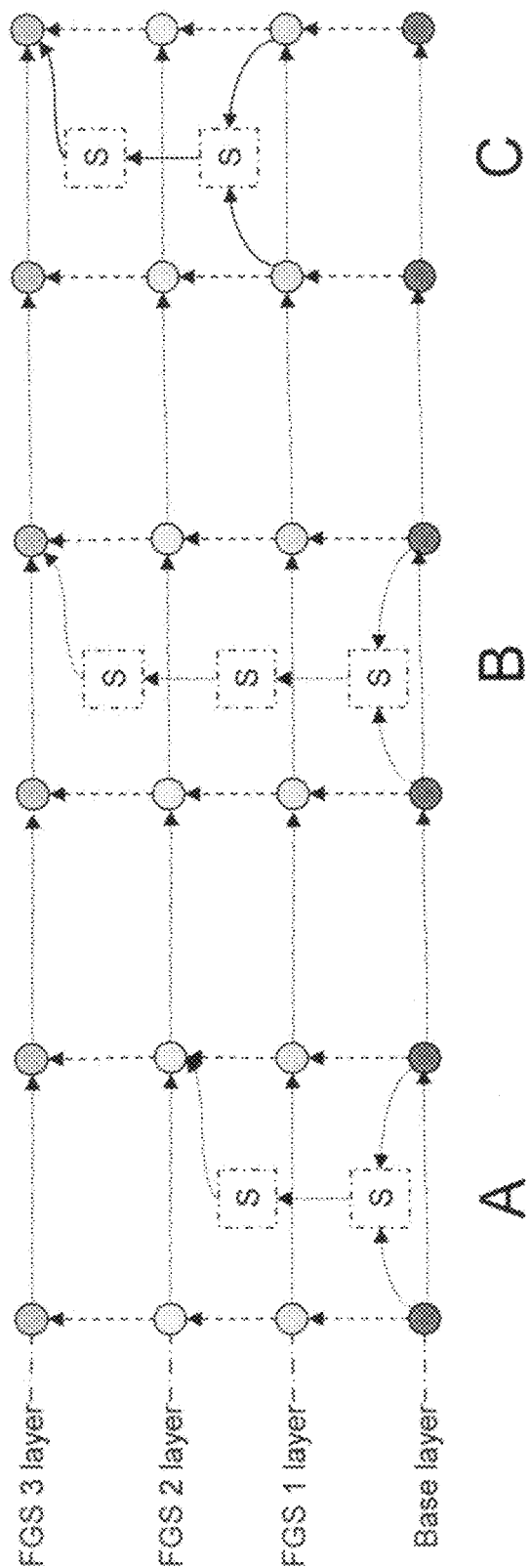

All the switches illustrated in FIGS. 4 to 6 offer different functionalities and also have different properties. The rate necessary for the coding of the type-1 switches is lower than that of the type-2 switches, which is itself lower than that of the type-3 switches. According to the needs of the clients, the server can be caused to vary the frequency and the type of switch transmitted.

The invention is based on a congestion control mechanism called RLM (Receiver-driven Layered Multicast). Reference can usefully be made in this regard to the article by Steven McCANNE, Van JACOBSON and Martin VETTERLI entitled "*Receiver-driven Layered Multicast*", ACM SIGCOMM 96, 1996. This client-based mechanism is adapted to multicast video sessions. In this mechanism, the server has no active role. It is content to transmit a set of streams representing the same video at several quality levels, on separate multicast groups.

Figure 7:
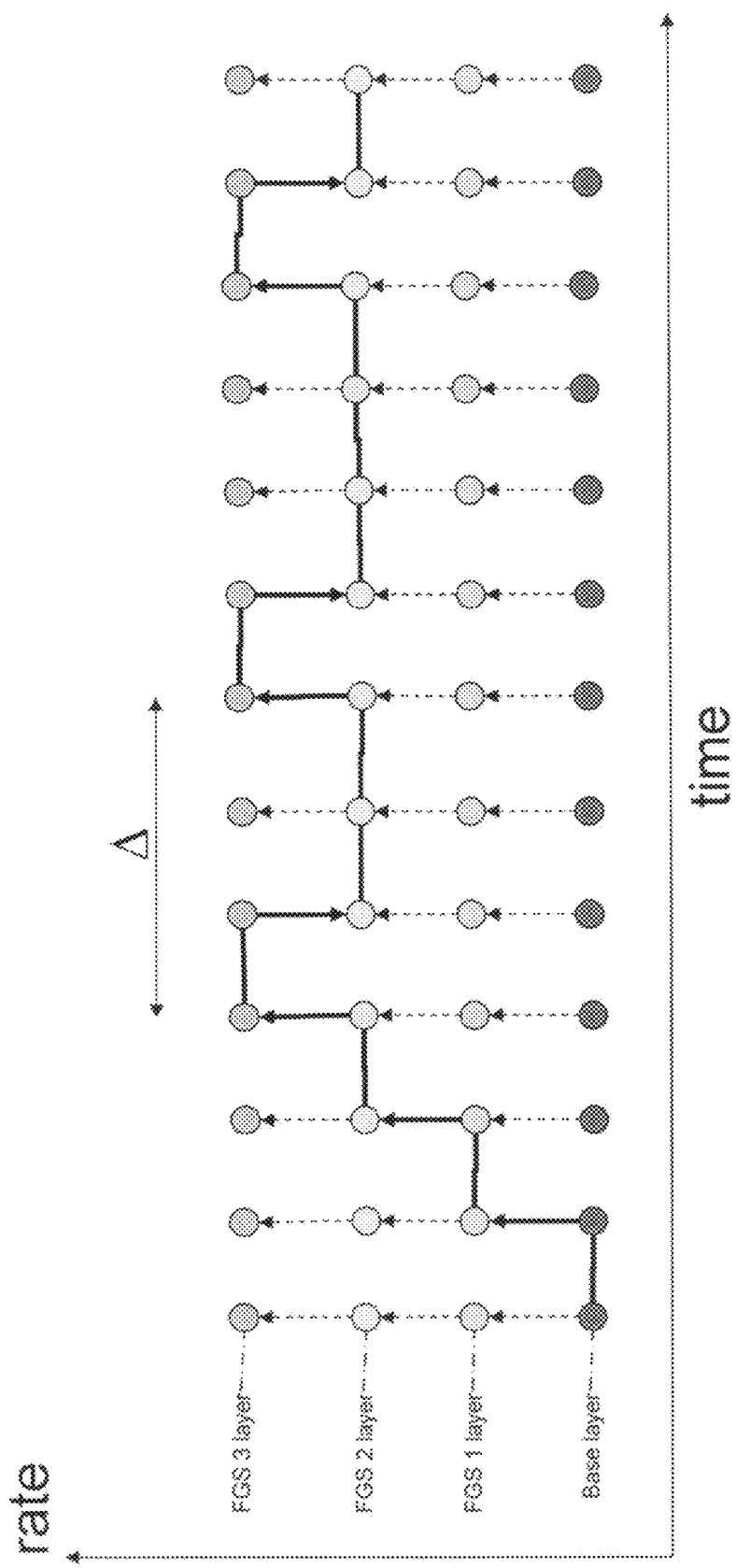
FIG. 7 illustrates schematically the RLM (Receiver-driven Layered Multicast) congestion control mechanism; 11.

In order to determine its optimal reception rate, each client makes attempts at subscribing to a set of multicast groups. As long as these attempts do not cause any congestion, each client increments the number of multicast groups requested by one unit. If an additional attempt at subscription causes congestion, the new group is rejected and the previous subscription configuration is returned to. After a period of time A, a new subscription attempt is made for this same group. FIG. 7 illustrates this mechanism.

In order not to cause transient congestion during excessively repeated subscription attempts. the period of time A between two subscription attempts is increased for each fruitless attempt.

The RLM mechanism thus makes it possible to converge towards a stable and optimal state.

Figure 8:
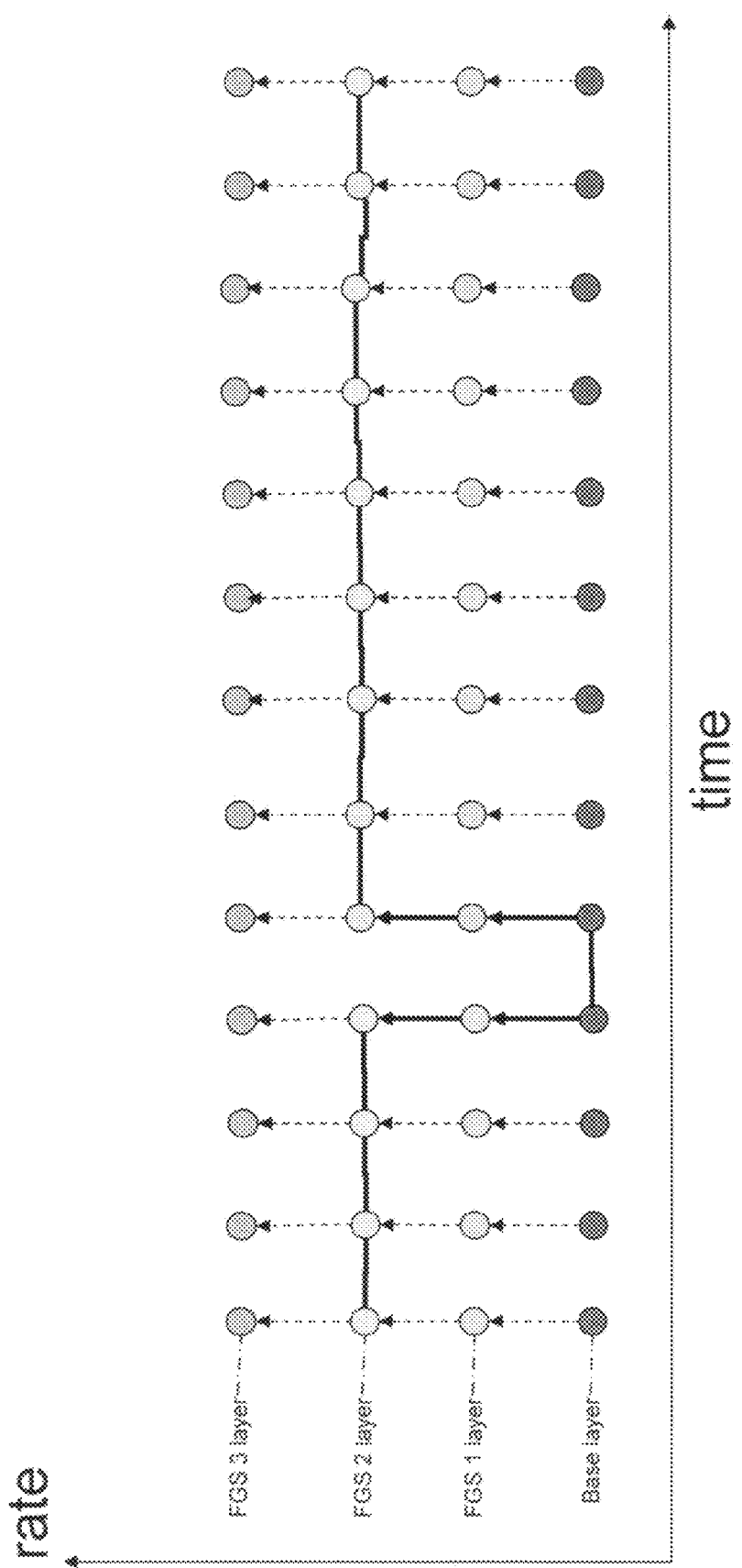
FIG. 8 illustrates schematically an example of change in quality levels in the modified version, in accordance with the present invention, of the RLM congestion control mechanism.

In accordance with the present invention, slight modifications are made to the RLM mechanism to enable it to react better to the phenomena of isolated congestion. An isolated congestion is a phenomenon of congestion at one point that was not predictable and will have no influence on the future behavior of the network. In concrete terms, a drop in transmission rate (or losses) of short duration occurs and then there is a rapid return to the initial rate. The RLM rate increase algorithm is then not suitable. This is because, in this case, it is necessary to return rapidly to the initial rate, without passing through steps as in the basic RLM mechanism. The modifications made to the basic mechanism are as follows: a client can pass from one level to any higher level directly in the case of isolated congestion, just as he can drop by more than one level by rejecting several multicast groups. This situation is illustrated by FIG. 8, which shows a client passing directly from level 2 to the base level, and then from the base level to level 2.

Figure 9:
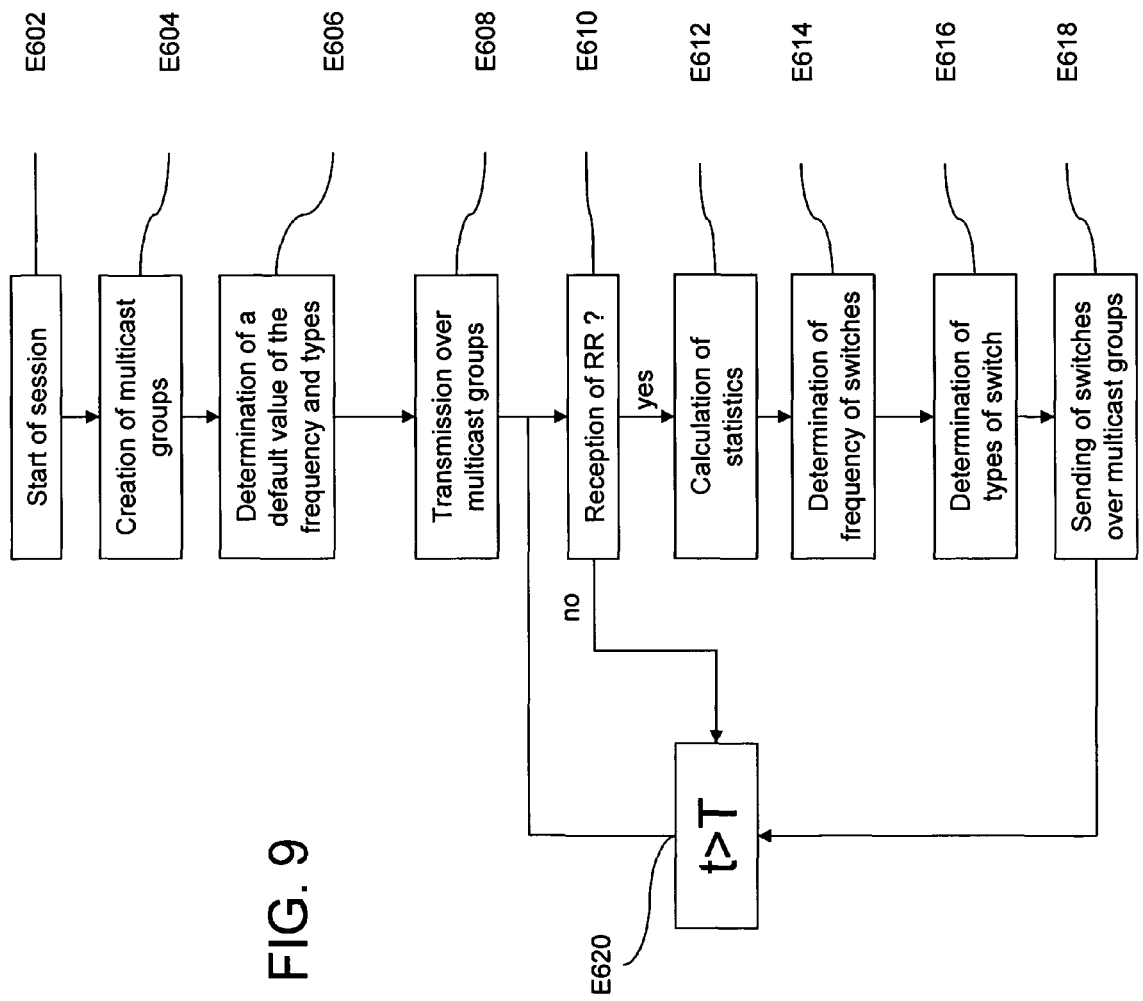
FIG. 9 is a flow diagram illustrating the main steps of a data transmission method according to the present invention, in a particular embodiment.

The flow diagram in FIG. 9 depicts the overall functioning of the server.

A video session begins with step E602, during which an operator decides on a video to transmit. It will be assumed that this video is stored on a storage unit in a compressed form. A scalable compression has been used, so that this video consists of a set of scalability levels. Among these levels, a certain number are quality enhancement levels of the FGS type.

In addition to the video data, switches of any type have been precalculated, so as to allow passage from one FGS level to another every N images. N can take a value greater than or equal to 1.

During the following step E604, the server determines the number of multicast groups to create according to the number of scalability levels existing in the video. Advantageously, one multicast group is created per scalability level. However, in a variant, some levels can be grouped together.

The sending of data over a multicast group is virtual as long as no client subscribes to this group. In other words, the data passes over the network only if at least one client requests it.

The following step E606 initiates the determination of a default value of the frequency and types of switches to be transmitted. Among all the switches available, the switch of the type illustrated in FIG. 6 is the most universal since it allows passage between all the FGS levels. This type of switch will therefore be transmitted at a frequency making it possible to pass from one level to another every N images.

During the following step E608, the video data is transmitted over its respective multicast group. The switch data is transmitted over the multicast group transporting the video data corresponding to the lowest level as from which the switch allows transition between levels. For switches of the type illustrated in FIG. 6, this level is the base level in each resolution. Note that a multicast group could also be created for each type of switch sent. A client could then subscribe to one of these groups according to his needs, which is more optimal in terms of rate consumption.

Step E608 is followed by step E610 during which the server checks whether one or more receivers have transmitted Receiver Reports (RR). This is because, as described below in relation to FIG. 10, when he makes an attempt to subscribe to a higher level, each client transmits an RR. These RRs are responsible for carrying to the server information representing the behavior of the congestion control algorithm used by the client. In the case of use of the RLM mechanism, the client transmits three items of information to the server:

$\Delta$: interval of time between the last two attempts at subscription;

$L_s$: starting quality level at the time of the attempt at subscription;

$L_T$: end quality level at the attempt of subscription.

It may be noted that, in another implementation, only a subset of clients can be responsible for transmitting RRs to the server. This is because, in the multicast sessions comprising a large number of clients, an increase in the RRs would generate a rate associated with the sending of RRs that is significant. In this case, solutions exist limiting the rate associated with the RRs. These solutions consist of grouping the clients in subnetworks having similar transmission characteristics. In each of the subnetworks, one of the clients is designated to represent all the others. This representative client will be responsible for transmitting information representing the reception conditions of his subnetwork, the other clients of the subnetwork transmitting no RR. In accordance with the present invention, each representative client will transmit information representing the behavior of his RLM algorithm. He will in addition be able to indicate the number of clients that he represents in these RRs, this information being useful for calculating statistics. The fact that some clients do not transmit an RR does not prevent them from using the RLM algorithm nor using switches.

If during step E610 no RR has been received, step E620 is passed to, which fulfils the role of a time delay of value T. When the time delay period has passed, step E610 is returned to.

If during step E610 at least one RR has been received, this step is followed by step E612. The server then calculates statistics on all the RRs received. It can for example calculate the number of passages from one level to another for each possible transition. It can also calculate, for each of these transitions, the minimum value, the maximum value, the mean and the median value of $\Delta$.

The following step E614 initiates the determination of the frequency of the switches for each possible transition. Note here that each type of switch to be transmitted will have a frequency value that will be peculiar to it and will therefore be potentially different for each type. Several choices are offered to the server:

the frequency takes the maximum value: in this case, the server will satisfy all the clients, who will receive switches frequently. However, this solution is sub-optimal in terms of network use since not all the clients need switches as frequently;

the frequency takes the median or mean value: in this case, it is desired to satisfy the most representative clients;

the frequency takes the minimum value: in this case, the cost in terms of rate of the switch is minimized.

The mean value of the switch sending frequency will preferably be chosen.

The following step E616 consists of determining the type or types of switch to send. Advantageously, this step consists of transmitting switches for all the transitions found by means of the RRs. The underlying idea is not to transmit a switch for transitions that are not requested. If, for a set of transitions found, several solutions are possible, the most economical solutions in terms of rate will be chosen.

The switches are transmitted during the following step E618, with the frequencies and types determined previously.

Next step E620 is returned to.

Figure 10:
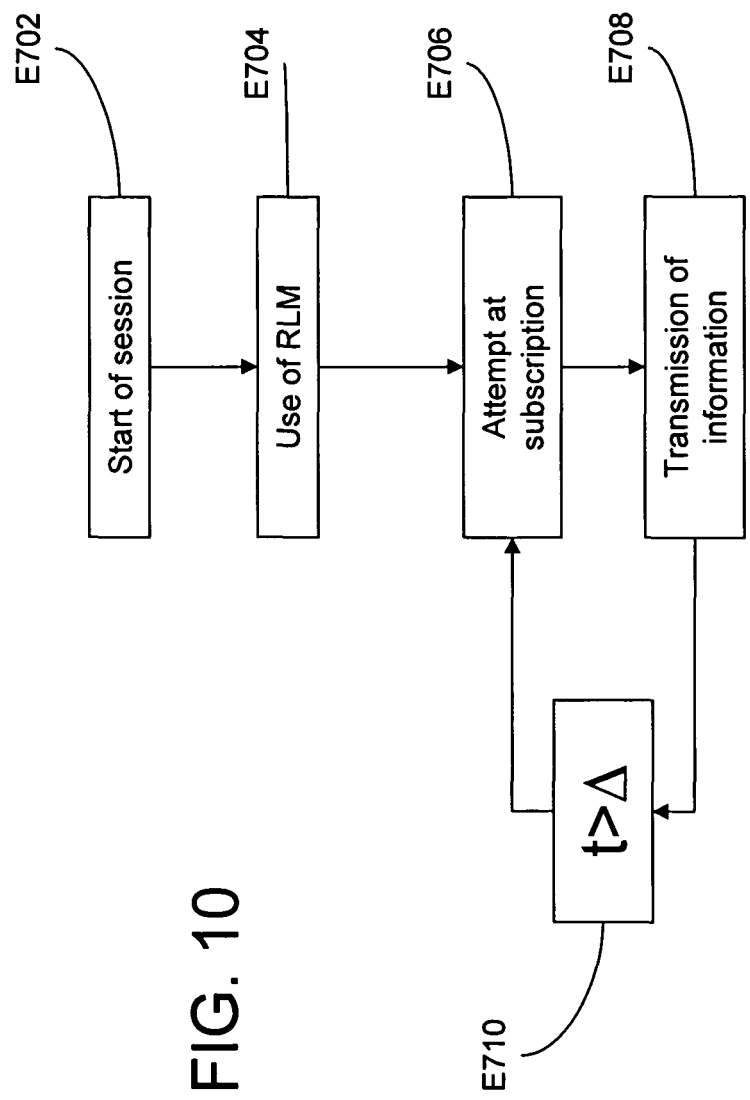
FIG. 10 is a flow diagram illustrating the behavior of a client during the data transmission method according to the present invention, in a particular embodiment.

The flow diagram in FIG. 10 illustrates the behavior of the client. During step E702, he connects to the video session.

During this step, he receives a description of the sessions transmitted in the form of SDP (Session Description Protocol) messages transmitted by the server.

After having received this description, he uses the RLM congestion control mechanism modified as described previously in order to determine his optimal bandwidth (step E704).

During the following steps E706 and E708, for each attempt at subscribing to a higher FGS level, he sends an RR as described above. This step is followed by a time delay (step E710) whose duration depends on the interval between two subscription attempts calculated by the RLM mechanism. Then step E706 is returned to.

As indicated in the introduction, the invention can also be implemented using a non-scalable video coding of the H.264 type.

In this second embodiment, several precoded streams representing one and the same video at different qualities (and at different rates) are sent over different multicast groups. Let the number of video streams generated by the server be denoted N_stream. Each client uses the RLM congestion control mechanism. However, unlike the first embodiment of the invention described above, which was based on an SVC coding, the client subscribes not to a set of multicast groups containing a basic version of the video and enhancement versions, but to only one multicast group at a time.

The RLM algorithm indicates the moments of passage from a given level of quality to another level, of lower or higher quality, in the same way as the approach based on an SVC coding.

In this second embodiment, the algorithms in FIGS. 9 and 10 are applied in the same way. However, the switch data is of a different nature. This is because, here, the switches are SP images making it possible to pass from a first video stream to a second video stream, as described in the article by M. E. NILSSON et al. cited above.

These SP images are transported by the multicast group from which the transition is made. For example, the SP images allowing passage from stream N to stream N+1 are transported in the multicast group transporting the level N. The frequency of passage from one video stream to another video stream and the type of passage are fixed by the algorithm in FIG. 9.

It is assumed that a set of passage signals permitting at the most passage from a stream at a given quality to one of the other remaining N_stream−1 streams is associated with this set of N_stream video streams. The frequency of these switches is set to a given value Fd. At the start of the session, all the types of switch are sent at a frequency equal to Fd. Then the frequency and type of switch sent will change during the session, following the algorithm in FIG. 9.

Figure 11:
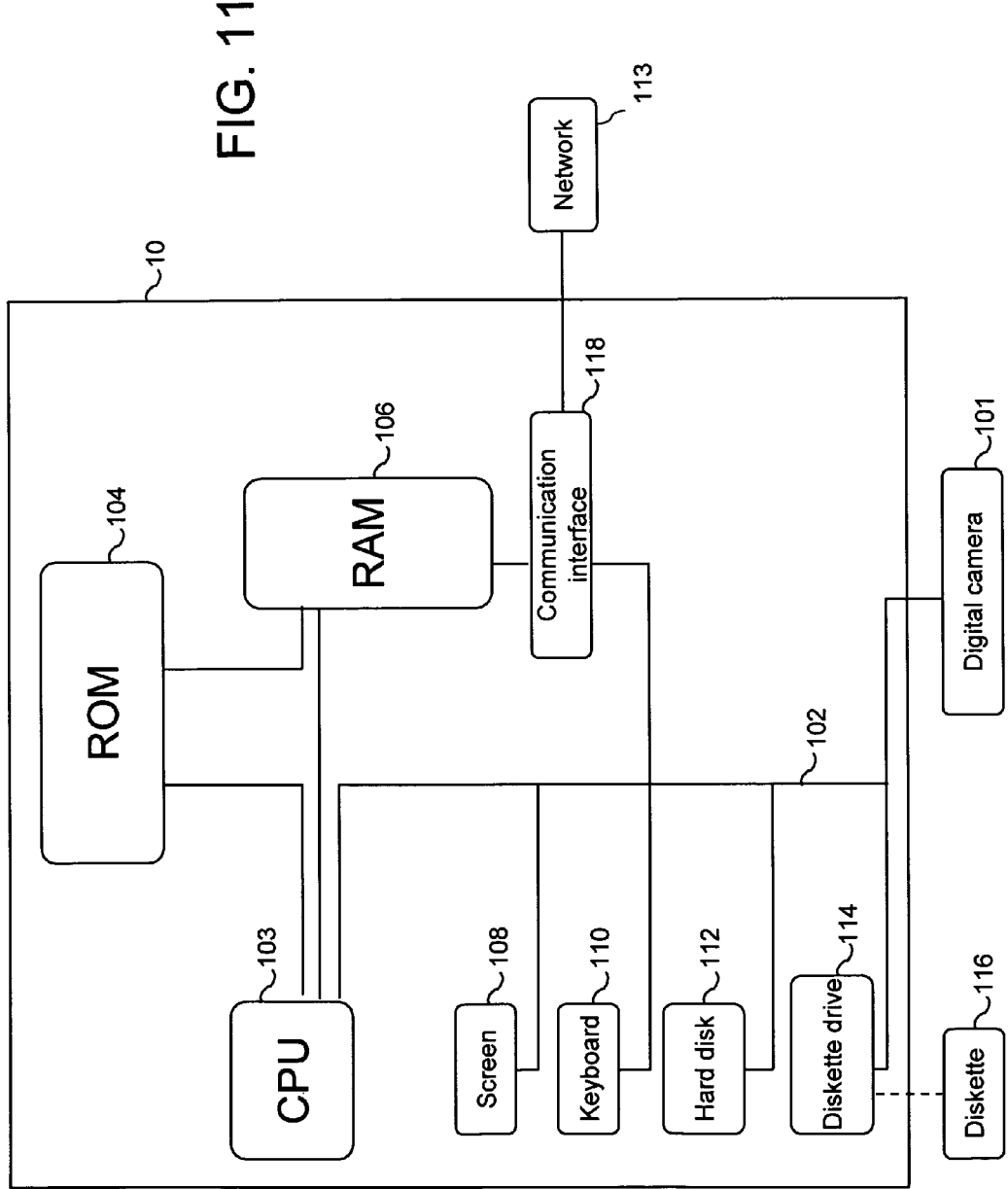
FIG. 11 depicts schematically a particular embodiment of an apparatus able to implement the present invention.

As depicted in FIG. 11, a device implementing the invention is for example a microcomputer 10 connected to various peripherals, for example a digital camera 101 (or a scanner, or any image acquisition or storage means) connected to a graphics card and supplying information to be compressed according to the invention.

The device 10 comprises a communication interface 118 connected to a network 113 able to transmit digital data to be processed or to transmit data processed by the device.

The device 10 also comprises a storage means 112 such as a hard disk. It also comprises a drive 114 for disks 116. This disk 116 may be a diskette, a CD-ROM, or a DVD-ROM, for example. The disk 116, like the disk 112, may contain data processed according to the invention as well as the program or programs implementing the invention which, once read by the device 10, will be stored on the hard disk 112. In a variant, the program or programs enabling the device to implement the invention can be stored in read-only memory 104 (referred to as ROM in the drawing). In another variant, this program or programs can be received in order to be stored in an identical fashion to that described above by means of the communication network 113.

The device 10 has a screen 108 for displaying the data to be processed or serving as an interface with the user, who can thus parameterize certain processing modes by means of the keyboard 110 or any other means (a mouse for example).

The central unit 103 (referred to as CPU in the drawing) executes the instructions relating to the implementation of the invention, instructions stored in the read-only memory 104 or in the other storage elements. On powering up, the processing programs stored in a non-volatile memory, for example the ROM 104, are transferred into the random access memory RAM 106 which will then contain the executable code of the invention as well as registers for storing the variables necessary for implementing the invention.

In more general terms, an information storage means, which can be read by a computer or microprocessor, integrated or not into the device, possibly totally or partially removable, stores a program implementing the data transmission method.

The communication bus 102 affords communication between the various elements included in the microcomputer 10 or connected to it. The representation of the bus 102 is not limiting and in particular the central unit 103 is able to communicate instructions to any element of the microcomputer 10 directly or by means of another element of the microcomputer 10.

The invention claimed is:

1. A method of transmitting coded data representing a digital video, from a server to a plurality of clients, at least one subset of the plurality of clients using one or more congestion control algorithms, the method employing a plurality of different types of passage signals for passing from a coded representation of the video at a given quality level to a coded representation of the video at one or more quality levels different from the given level based on a type of passage signal used, the method comprising steps of:
    selecting a type of passage signal to be used, from among the plurality of different types of passage signals; and
    sending a passage signal of the selected type at least to the at least one subset of clients using information representing a behavior of the one or more congestion control algorithms used by the at least one subset of clients,
    wherein the quality levels are scalability levels, and
    wherein the plurality of different types of passage signals include:
        a first type of passage signal for passing from one quality level to an immediately higher quality level,
        a second type of passage signal for passing from one quality level to any single higher quality level, and
        a third type of passage signal for passing from one quality level to more than one higher quality level.

2. The method according to claim 1, further comprising a step of calculating statistics concerning transitions between quality levels from the information representing the behavior of the one or more congestion control algorithms.

3. The method according to claim 2, further comprising a step of determining a type and a frequency of change in quality level according to the statistics.

4. The method according to claim 1, further comprising steps of:
    creating, in a network including the server and the plurality of clients, a predetermined number of multicast groups to which the plurality of clients are able to subscribe, according to a number of quality levels included in the video;
    initializing passage data by attributing a default value to a quality level change frequency and choosing a default type of passage signal to be transmitted;

transmitting video data over a multicast group, wherein the passage data is transmitted over a multicast group transmitting the video data corresponding to a lowest quality level included in the passage data that allows a transition between levels;

checking whether one or more clients have transmitted to the server one or more reports including information representing the behavior of the one or more congestion control algorithms used by the one or more clients;

if at least one report has been transmitted, calculating statistics concerning transitions between levels from information included in the at least one report;

attributing a new value to the quality level change frequency for each possible transition, according to the calculated statistics;

determining one or more types of passage signals to be transmitted, according to the information included in the at least one report; and transmitting passage signals of the determined one or more types, at corresponding frequencies according to the calculated statistics from the server to the one or more clients.

5. The method according to claim 4, wherein the step of creating includes creating one multicast group per quality level.

6. The method according to claim 2, wherein the step of calculating includes calculating a number of passages from one quality level to another, for each possible transition.

7. The method according to claim 4, wherein the step of calculating includes calculating, for each possible transition, a minimum value, a maximum value, a mean value, and a median value of an interval of time between a last two attempts of a client to subscribe to a multicast group.

8. The method according to claim 4, wherein, the step of attributing includes attributing, to the quality level change frequency for each possible transition, a mean frequency value.

9. The method according to claim 4, wherein, during the step of determining, a determination is made to transmit a passage signal for each transition for which the at least one report includes information.

10. A device for transmitting coded data representing a digital video, from a server to a plurality of clients, at least one subset of the plurality of clients using one or more congestion control algorithms, the device employing a plurality of different types of passage signals for passing from a coded representation of the video at a given quality level to a coded representation of the video at one or more quality levels different from the given level based on a type of passage signal used, the device comprising:

means for selecting a type of passage signal to be used, from among the plurality of different types of passage signals; and means for sending a passage signal of the selected type at least to the at least one subset of clients using information representing a behavior of the one or more congestion control algorithms used by the at least one subset of clients, wherein the quality levels are scalability levels, and wherein the plurality of different types of passage signals include:
a first type of passage signal for passing from one quality level to an immediately higher quality level,
a second type of passage signal for passing from one quality level to any single higher quality level, and
a third type of passage signal for passing from one quality level to more than one higher quality level.

11. The device according to claim 10, further comprising means for calculating statistics concerning transitions between quality levels from the information representing the behavior of the one or more congestion control algorithms.

12. The device according to claim 11, further comprising means for determining a type and a frequency of change in quality level according to the statistics.

13. The device according to claim 10, further comprising:

means for creating, in a network including the server and the plurality of clients, a predetermined number of multicast groups to which the plurality of clients are able to subscribe, according to a number of quality levels included in the video;

means for initializing passage data by attributing a default value to a quality level change frequency and choosing a default type of passage signal to be transmitted;

means for transmitting video data over a multicast group and for transmitting the passage data over a multicast group transmitting the video data corresponding to a lowest quality level included in the passage data that allows transition between levels;

means for checking whether one or more clients have transmitted to the server one or more reports including information representing the behavior of the one or more congestion control algorithms used by the one or more clients;

means for calculating statistics concerning the transitions between levels, from information contained in the one or more reports;

means for attributing a new value to the quality level change frequency for each possible transition, according to the calculated statistics;

means for determining one or more types of passage signals to be transmitted, according to the information included in the one or more reports; and means for transmitting passage signals of the determined one or more types at corresponding frequencies according to the calculated statistics from the server to the one or more clients.

14. The device according to claim 13, wherein the means for creating is adapted to create one multicast group per quality level.

15. The device according to claim 11, wherein the means for calculating is adapted to calculate a number of passages from one quality level to another for each possible transition.

16. The device according to claim 13, wherein the means for calculating is adapted to calculate, for each possible transition, a minimum value, a maximum value, a mean value, and a median value of an interval of time between a last two attempts by a client to subscribe to a multicast group.

17. The device according to claim 13, wherein the means for attributing is adapted to attribute, to the quality level change frequency for each possible transition, a mean frequency value.

18. The device according to claim 13, wherein the means for determining is adapted to determine to transmit a passage signal for each transition for which the one or more reports include information.

19. The data transmission device according to claim 10, wherein the data transmission device is included in a telecommunications system along with a plurality of other terminal devices connected through a telecommunications network.

20. A non-transitory computer-readable storage medium storing computer-executable instructions that, when executed by a computer, cause the computer to perform a method of transmitting coded data representing a digital video, from a server to a plurality of clients, at least one subset of the plurality of clients using one or more congestion control algorithms, the method employing a plurality of different types of passage signals for passing from a coded representation of the video at a given quality level to a coded representation of the video at one or more quality levels different from the given level based on a type of passage signal used, the method comprising steps of:
- selecting a type of passage signal, from among the plurality of different types of passage signals; and
- sending a passage signal of the selected type at least to the at least one subset of clients using information representing a behavior of the one or more congestion control algorithms used by the at least one subset of clients,
- wherein the quality levels are scalability levels, and
- wherein the plurality of different types of passage signals include:
  - a first type of passage signal for passing from one quality level to an immediately higher quality level,
  - a second type of passage signal for passing from one quality level to any single higher quality level, and
  - a third type of passage signal for passing from one quality level to more than one higher quality level.

* * * * *